(12) United States Patent
Lee

(10) Patent No.: US 7,453,192 B2
(45) Date of Patent: Nov. 18, 2008

(54) BACKLIGHT ASSEMBLY AND LIQUID CRYSTAL DISPLAY APPARATUS

(75) Inventor: Hea-Chun Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 262 days.

(21) Appl. No.: 11/200,360

(22) Filed: Aug. 9, 2005

(65) Prior Publication Data
US 2006/0033412 A1 Feb. 16, 2006

(30) Foreign Application Priority Data
Aug. 10, 2004 (KR) .................. 10-2004-0062963

(51) Int. Cl.
*H01J 19/50* (2006.01)
(52) U.S. Cl. ............... 313/288; 313/634; 361/681; 349/58
(58) Field of Classification Search ............. 313/50, 313/49, 269, 288, 634; 349/70, 61, 68, 71, 349/58; 361/681
See application file for complete search history.

(56) References Cited

U.S. PATENT DOCUMENTS

| | | | | |
|---|---|---|---|---|
| 5,432,626 A * | 7/1995 | Sasuga et al. | ............... | 349/58 |
| 5,466,990 A * | 11/1995 | Winsor | ............... | 315/56 |
| 5,486,942 A * | 1/1996 | Ichikawa et al. | ............... | 349/58 |
| 5,583,681 A * | 12/1996 | Shioya et al. | ............... | 349/60 |
| 5,808,707 A * | 9/1998 | Niibori et al. | ............... | 349/60 |
| 5,903,096 A * | 5/1999 | Winsor | ............... | 313/493 |
| 5,933,206 A * | 8/1999 | Niibori et al. | ............... | 349/60 |
| 6,388,722 B1 * | 5/2002 | Yoshii et al. | ............... | 349/62 |
| 6,411,501 B1 * | 6/2002 | Cho et al. | ............... | 361/681 |
| 6,583,556 B2 * | 6/2003 | Oishi et al. | ............... | 313/495 |
| 6,674,250 B2 * | 1/2004 | Cho et al. | ............... | 315/291 |
| 2002/0041144 A1 * | 4/2002 | Fujishiro | ............... | 313/483 |
| 2002/0054249 A1 * | 5/2002 | Ryu et al. | ............... | 349/58 |
| 2002/0057405 A1 * | 5/2002 | Morishita et al. | ............... | 349/113 |
| 2003/0086255 A1 * | 5/2003 | Moon et al. | ............... | 362/97 |
| 2004/0041961 A1 * | 3/2004 | Lee | ............... | 349/58 |
| 2004/0105044 A1 * | 6/2004 | You | ............... | 349/58 |
| 2004/0239828 A1 * | 12/2004 | Cho | ............... | 349/58 |
| 2004/0252266 A1 * | 12/2004 | Shimizu et al. | ............... | 349/139 |
| 2004/0257796 A1 * | 12/2004 | Huang et al. | ............... | 362/31 |
| 2005/0018101 A1 * | 1/2005 | Choi et al. | ............... | 349/58 |
| 2005/0046331 A1 * | 3/2005 | Kim et al. | ............... | 313/493 |
| 2005/0105014 A1 * | 5/2005 | Hong | ............... | 349/65 |
| 2005/0116607 A1 * | 6/2005 | Park et al. | ............... | 313/485 |
| 2006/0055840 A1 * | 3/2006 | Kim | ............... | 349/58 |

* cited by examiner

*Primary Examiner*—Karabi Guharay
*Assistant Examiner*—Hana A Sanei
(74) *Attorney, Agent, or Firm*—Cantor Colburn LLP

(57) ABSTRACT

A backlight assembly includes a receiving container having a bottom and a side member to provide a receiving space, a flat-type fluorescent lamp received into the receiving container to emit a light, and a supporting member having a buffer disposed between the receiving container and the flat-type fluorescent lamp to buff an impact applied to the flat-type fluorescent lamp while supporting the flat-type fluorescent lamp. The buffer has protrusions protruding from a face of the supporting member. Thus, the backlight assembly may enhance impact resistance of the backlight assembly and prevent damage of the flat-type fluorescent lamp.

36 Claims, 13 Drawing Sheets

BACKLIGHT ASSEMBLY AND LIQUID CRYSTAL DISPLAY APPARATUS

This application claims priority to Korean Patent Application No. 2004-62963 filed on Aug. 10, 2004 and all the benefits accruing therefrom under 35 U.S.C. §119, the contents of which are herein incorporated by reference in its entirety.

BACKGROUND OF THE INVENTION

1. Field of the Invention

The present invention relates to a backlight assembly and a liquid crystal display apparatus. More particularly, the present invention relates to a backlight assembly employing a flat-type fluorescent lamp as a light source and a liquid crystal display apparatus having the backlight assembly.

2. Description of the Related Art

In general, a liquid crystal display apparatus, one type of a flat panel display apparatus, displays images using liquid crystal. The liquid crystal display apparatus has various characteristics, such as small size, low power consumption, lightweight, etc. rendering the liquid crystal display apparatus applicable to various industries.

The liquid crystal display apparatus requires a separate light source to display images because a liquid crystal display panel for the liquid crystal display apparatus is a light-receiving element that does not emit light.

As a light source for the liquid crystal display apparatus, a cold cathode fluorescent lamp ("CCFL") having a tubular shape is mainly used. The liquid crystal display apparatus employing the CCFL is classified as either an edge illumination type or a direct illumination type. In the edge illumination type liquid crystal display apparatus, the light source is positioned at a position adjacent to a side face of a transparent light guide plate, and the light from the light source is reflected from various faces of the light guide plate and directed to the liquid crystal display panel. In the direct illumination type liquid crystal display apparatus, the light source is disposed under the liquid crystal display panel, a diffusing plate is disposed between the light source and the liquid crystal display panel, and a reflecting plate is disposed under the light source. The light from the light source is reflected from the reflecting plate and diffused by the diffusing plate, and the diffused light is applied to the liquid crystal display panel.

However, since the optical member such as the light guide plate, the diffusing plate, etc. induces light loss, a light efficiency of the liquid crystal display apparatus as described above is lowered. Furthermore, manufacturing cost of the liquid crystal display apparatus increases, and brightness uniformity of the liquid crystal display apparatus is deteriorated.

In recent, in order to reduce the manufacturing cost and enhance the brightness uniformity within a display apparatus, a flat-type fluorescent lamp directly emitting a planar light has been developed. The flat-type fluorescent lamp, generally, includes a light source body divided into a plurality of discharge spaces and emits the light using plasma generated in each of the discharge spaces.

However, the flat-type fluorescent lamp is vulnerable to an external impact applied thereto since the flat-type fluorescent lamp has a thin thickness and a wide display area. Particularly, in case that an impact test is performed for the flat-type fluorescent lamp combined with a backlight assembly, the flat-type fluorescent lamp is susceptible to damage.

BRIEF SUMMARY OF THE INVENTION

The present invention provides a backlight assembly capable of improving impact resistance of a flat-type fluorescent lamp.

The present invention also provides a liquid crystal display apparatus having the above backlight assembly.

In one exemplary embodiment of a backlight assembly, the backlight assembly includes a receiving container, a flat-type fluorescent lamp and a supporting member. The receiving container includes a bottom and a side member to provide a receiving container with a receiving space for the flat-type fluorescent lamp. The flat-type fluorescent lamp is received within the receiving container to emit a light. The supporting member has a buffer disposed between the receiving container and the flat-type fluorescent lamp to buff an impact applied to the flat-type fluorescent lamp while supporting the flat-type fluorescent lamp.

The buffer includes protrusions protruded from a face of the supporting member. The protrusions are formed on at least one face of first and second faces of the supporting member. The first and second faces face the flat-type fluorescent lamp and the receiving container, respectively.

The supporting member is formed at a position corresponding to an end portion of the flat-type fluorescent lamp. The supporting member includes a first supporting portion corresponding to a lower face of the flat-type fluorescent lamp and a second supporting portion corresponding to a side face of the flat-type fluorescent lamp. The second supporting portion is extended from the first supporting portion. The buffer is formed on at least one supporting portion of the first and second supporting portions.

The backlight assembly further includes a first frame that fixes an end portion of an upper face of the flat-type fluorescent lamp to the receiving container, and an inverter for generating a discharge voltage for the flat-type fluorescent lamp. The inverter is disposed on a rear face of the receiving container.

The backlight assembly further includes a diffusion plate disposed on the first frame to diffuse the light from the flat-type fluorescent lamp, an optical sheet disposed on the diffusion plate, and a second frame coupled to the receiving container to fix the diffusion plate and the optical sheet relative to the receiving container.

In one embodiment of a liquid crystal display apparatus, the liquid crystal display apparatus includes a backlight assembly, a liquid crystal display panel and an inverter.

The backlight assembly includes a receiving container having a bottom and a side member to provide a receiving space, a flat-type fluorescent lamp received within the receiving container to emit a light, and a supporting member having a buffer disposed between the receiving container and the flat-type fluorescent lamp to buff an impact applied to the flat-type fluorescent lamp while supporting the flat-type fluorescent lamp. The liquid crystal display panel is disposed on the backlight assembly to display an image using the light from the backlight assembly. The top chassis fixes the liquid crystal display to the backlight assembly.

In one exemplary embodiment of a supporting member for buffing an impact applied to a flat-type fluorescent lamp, the supporting member includes a plurality of supporting devices, each of the supporting devices including a first supporting portion, a second supporting portion extending from the first supporting portion at a non-zero angle, and a plurality of protrusions protruding from at least one of the first supporting portion and the second supporting portion, wherein the plurality of supporting devices are evenly distributable about a flat-type fluorescent lamp.

In one exemplary embodiment of a method of protecting a flat-type fluorescent lamp within a backlight assembly from damage resulting from external impacts, the backlight assembly including a receiving container having a bottom and a side member for providing a receiving space for receiving the flat-type fluorescent lamp, the method includes providing a supporting member with a plurality of protrusions protruding from a face of the supporting member and inserting the supporting member between the receiving container and the flat-type fluorescent lamp.

According to the above, the liquid crystal display apparatus may enhance impact resistance of the backlight assembly and prevent damage of the flat-type fluorescent lamp.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
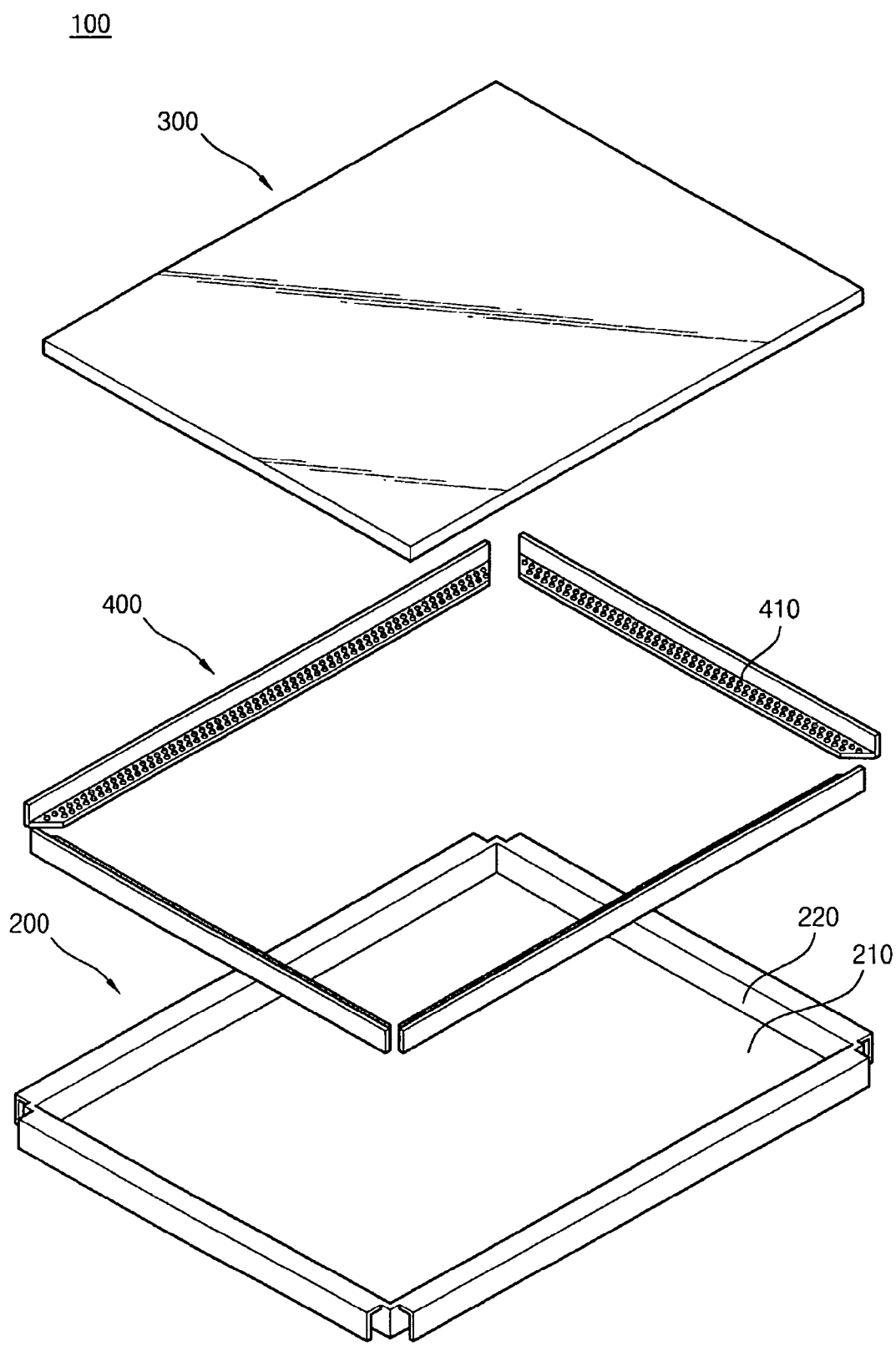
FIG. 1 is an exploded perspective view showing an exemplary embodiment of a backlight assembly according to the present invention.
Figure 2:
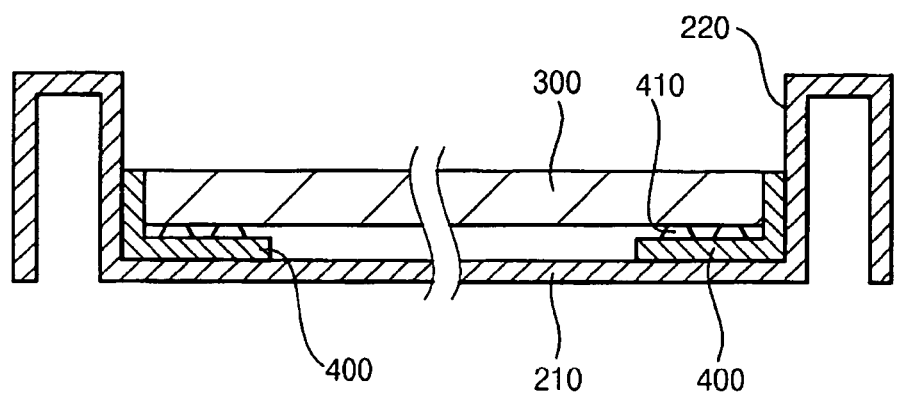
FIG. 2 is a cross-sectional view of the backlight assembly shown in FIG. 1.

Hereinafter, the present invention will be explained in detail with reference to the accompanying drawings. In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. FIG. 1 is an exploded perspective view showing an exemplary embodiment of a backlight assembly according to the present invention. FIG. 2 is a cross-sectional view of the backlight assembly shown in FIG. 1.

Referring to FIGS. 1 and 2, a backlight assembly 100 includes a receiving container 200, a flat-type fluorescent lamp 300, and a supporting member 400. The receiving container 200 includes a bottom 210 and a side member 220 to provide a receiving space for the flat-type fluorescent lamp 300. The flat-type fluorescent lamp 300 received within the receiving container 200 emits a light. The supporting member 400 is disposed between the receiving container 200 and the flat-type fluorescent lamp 300 to support the flat-type fluorescent lamp 300. The supporting member 400 has a buffer 410 buffering an impact applied to the flat-type fluorescent lamp 300.

The receiving container 200 includes the bottom 210 and the side member 220 extending from peripheral edges of the bottom 210 to form the receiving space. The side member 220 may include a plurality of sides each extending from a peripheral edge of the bottom 210. In the illustrated embodiment, the side member 220 includes a first side, a second side, a third side, and a fourth side. The sides may be arranged in parallel pairs for forming a parallelogram, such as a rectangle. In order to provide the receiving space and enhance coherence between the receiving container 200 and other elements, one or more of the sides of the side member 220 may be formed in an inverted U-shape or channel shape, where an open side of the inverted U-shape or channel shape of the side or sides having such a shape faces a rear of the backlight assembly 100, rather than a front of the backlight assembly 100. The receiving container 200, by example only, is formed of a metal material having a superior strength. The supporting member 400 and the flat-type fluorescent lamp 300 are received into the receiving space of the receiving container 200 as shown.

The flat-type fluorescent lamp 300 has a plate-like shape generally corresponding to the bottom 210 so as to emit planar light. The flat-type fluorescent lamp 300 generates a plasma discharge in response to a discharge voltage externally applied thereto, and converts ultraviolet light generated by the plasma discharge into visual light, to thereby emit the visual light. In order to emit the planar light uniformly through the whole area of the flat-type fluorescent lamp 300, an inner space of the flat-type fluorescent lamp 300 is divided into a plurality of discharge spaces.

The supporting member 400 is disposed between the receiving container 200 and the flat-type fluorescent lamp 300 to support the flat-type fluorescent lamp 300. Particularly, the supporting member 400 is disposed at a position corresponding to end portions of the flat-type fluorescent lamp 300. Such end portions may correspond to entire peripheral edges, portions of peripheral edges, and corners of the flat-type fluorescent lamp 300, or a subset of such end portions. The flat-type fluorescent lamp 300 is spaced apart and electrically insulated from the receiving container 200 by the supporting member 400. In order to insulate the flat-type fluorescent lamp 300 from the receiving container 200, the supporting member 400 is formed of an insulating material, or is coated with an insulating material. Also, the supporting member 400 is formed of a material having elasticity so as to buff an external impact applied thereto. By example only, the supporting member 400 may be formed of silicon.

As shown in FIG. 1, the supporting member 400 includes four supporting devices corresponding to sides of the flat-type fluorescent lamp 300, respectively. However, the four supporting devices of the supporting member 400 may be integrally formed into one or two pieces. In yet another embodiment, the supporting member 400 may include multiple supporting devices corresponding to each side of the flat-type fluorescent lamp 300.

In an exemplary embodiment, the supporting member 400 has a buffer 410 to buff an impact applied to the flat-type fluorescent lamp 300.

Figure 3:
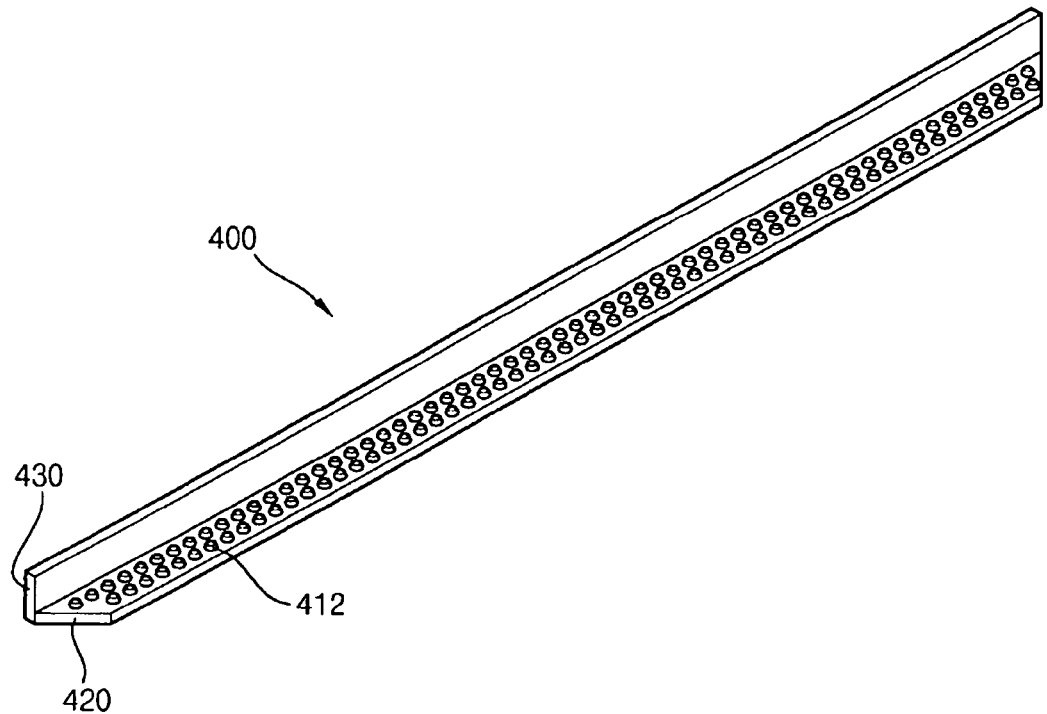
FIG. 3 is a perspective view of an exemplary embodiment of a supporting member shown in FIG. 1.
Figure 4:
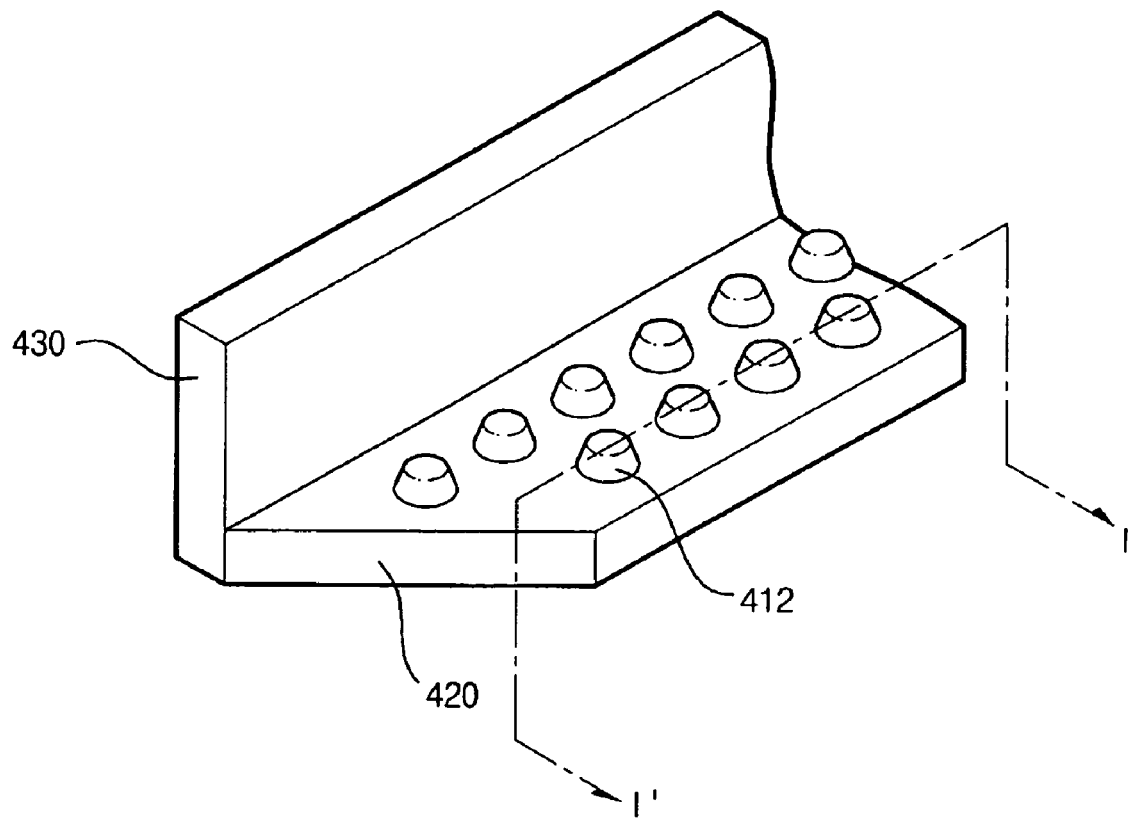
FIG. 4 is a partially enlarged perspective view of the supporting member shown in FIG. 3.
Figure 5:
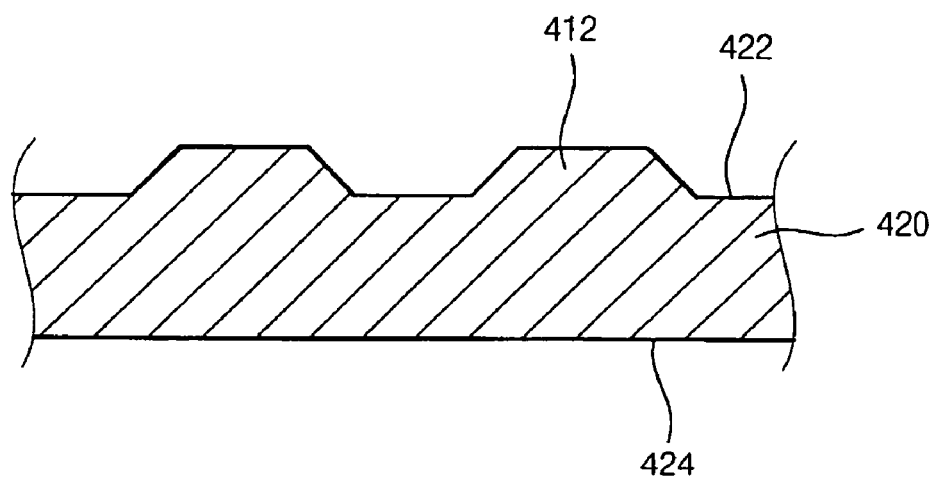
FIG. 5 is a cross-sectional view taken along line I-I' of FIG. 4.

FIG. 3 is a perspective view of an exemplary embodiment of the supporting member 400 shown in FIG. 1. FIG. 4 is a partially enlarged perspective view of the supporting member 400 shown in FIG. 3. FIG. 5 is a cross-sectional view taken along line I-I' of FIG. 4.

Referring to FIGS. 3 to 5, the supporting member 400 includes a first supporting portion 420 corresponding to a lower face of the flat-type fluorescent lamp 300, where the lower face of the flat-type fluorescent lamp 300 faces the bottom 210 of the receiving container 200, and a second supporting portion 430 corresponding to a side of the flat-type fluorescent lamp 300, where the side of the flat-type fluorescent lamp 300 faces a side member 220 of the receiving container 200. The second supporting portion 430 extends from the first supporting portion 420, such as at a non-zero angle including, but not limited to, a perpendicular angle. Alternatively, the first supporting portion 420 and the second supporting portion 430 may include a curved connection portion (not shown). The first supporting portion 420 has an area sufficient for supporting the flat-type fluorescent lamp 300 in a stable condition. In other words, the first supporting portion 420 may be evenly dispersed about end portions of the flat-type fluorescent lamp 300 such that support is uniformly provided for the flat-type fluorescent lamp 300, and thus will not wobble on top of the supporting member 400. The first supporting portion 420 is disposed at a position corresponding to a non-effective light emitting area through which the light from the flat-type fluorescent lamp 300 does not emit. The second supporting portion 430 has a smaller height than the side 220 of the receiving container 200, but the second supporting portion 430 may have the same height as a thickness of the flat-type fluorescent lamp 300. The height of the second supporting portion 430 may also have a greater height than the thickness of the flat-type fluorescent lamp 300, such as a height equivalent to or greater than the sum of the height of the protrusions 412 and the thickness of the flat-type fluorescent lamp 300.

The supporting member 400 has the buffer 410 to buff the external impact applied to the flat-type fluorescent lamp 300. The buffer 410 includes one or more protrusions 412 protruding from a surface of the supporting member 400 by a predetermined height. That is, the protrusions 412 have an attached end attached to the surface of the supporting member 400, and a free end for engaging the flat-type fluorescent lamp 300. The free end of each protrusion 412 extends a first distance from the surface of the supporting member 400. In one embodiment, the protrusions 412 may be irregularly arranged on the surface of the supporting member 400, however, in the illustrated embodiment, the protrusions 412 are regularly arranged so as to advantageously disperse the external impact uniformly. The protrusions 412 may be formed by molding the protrusions 412 with the first and/or second supporting portions 420, 430, such that the protrusions 412 are integral with the first and/or second supporting portions 420, 430. Alternatively, the protrusions 412 may be separately manufactured from the first and/or second supporting portions 420, 430 and then later adhered or otherwise arranged with respect to the first and second supporting portions 420, 430.

In order to enhance buffering capability of the protrusions 412 with respect to the external impact, the protrusions 412 have a truncated conical shape that includes a trapezoidal shape in vertical cross-section with respect to the surface of the supporting portion 420 or 430 of the supporting member 400 from which the protrusions 412 extend, such that each of the protrusions 412 has an upper width narrower than a lower width thereof. Also as part of the truncated conical shape, the protrusions 412 have a circular shape in horizontal cross-section with respect to the surface of the supporting portion 420 or 430 of the supporting member 400 from which the protrusions 412 extend. By example only, each of the protrusions 412 has a diameter from about 10 mm to about 20 mm. Actual dimensions of the protrusions 412 may depend on the size of the application for which the backlight assembly 100 will be employed. In the illustrated embodiment, the protrusions 412 all have approximately the same size. In another exemplary embodiment, the protrusions 412 may have different sizes arranged along the first and/or second supporting portions 420, 430. Since the protrusions 412 convert a full-surface contact between the supporting member 400 and the flat-type fluorescent lamp 300 into a point-contact, impulse applied to the flat-type fluorescent lamp 300 is thus reduced. While a truncated conical shape is illustrated, the protrusions 412 may alternatively have a rectangular shape or an oval shape in the horizontal cross-section with the respect to the surface of the supporting portion 420 or 430 of the supporting member 400 from which the protrusions 412 extend, and also have a rectangular shape or an oval shape in the vertical cross-section with the respect to the surface of the supporting portion 420 or 430 of the supporting member 400 from which the protrusions 412 extend.

In the illustrated embodiment, the protrusions 412 are formed on a first face 422 of the first supporting portion 420, which is facing a lower surface of the flat-type fluorescent lamp 300, where the lower surface faces the bottom 210 of the receiving container 200. Thus, the flat-type fluorescent lamp 300 received in the supporting member 400 makes contact with the protrusions 412. The protrusions 412 disperse the impulse applied to the flat-type fluorescent lamp 300 to prevent the flat-type fluorescent lamp 300 from being damaged.

Figure 6:
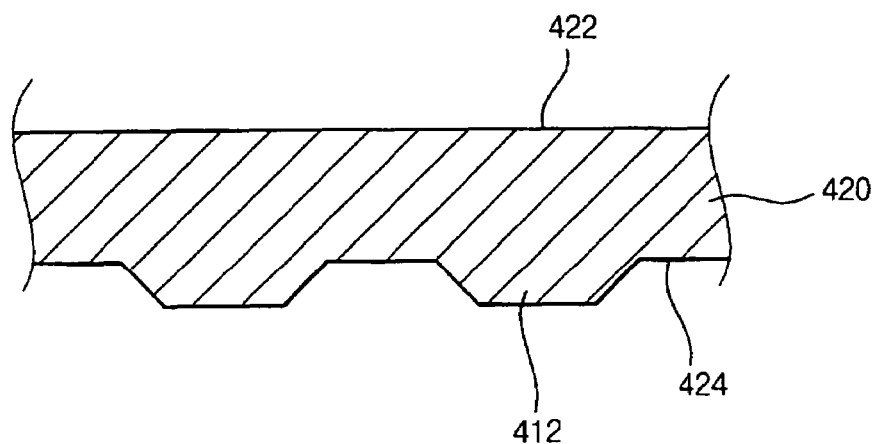
FIG. 6 is a cross-sectional view of another exemplary embodiment of the supporting member shown in FIG. 1.

FIG. 6 is a cross-sectional view of another exemplary embodiment of the supporting member 400 shown in FIG. 1. In FIG. 6, the same reference numerals denote the same elements in FIGS. 3 to 5, and thus any further descriptions of the same elements will be omitted.

Referring to FIG. 6, the protrusions 412 are formed on a second face 424 of the first supporting portion 420, which is opposite to the first face 422 and facing the bottom 210 of the receiving container 200. Thus, the flat-type fluorescent lamp 300 rests on the flat surface of the first face 422 of the first supporting portion 420 and the protrusions 412 make contact with the bottom 210 of the receiving container 200, to thereby reduce the impulse.

Figure 7:
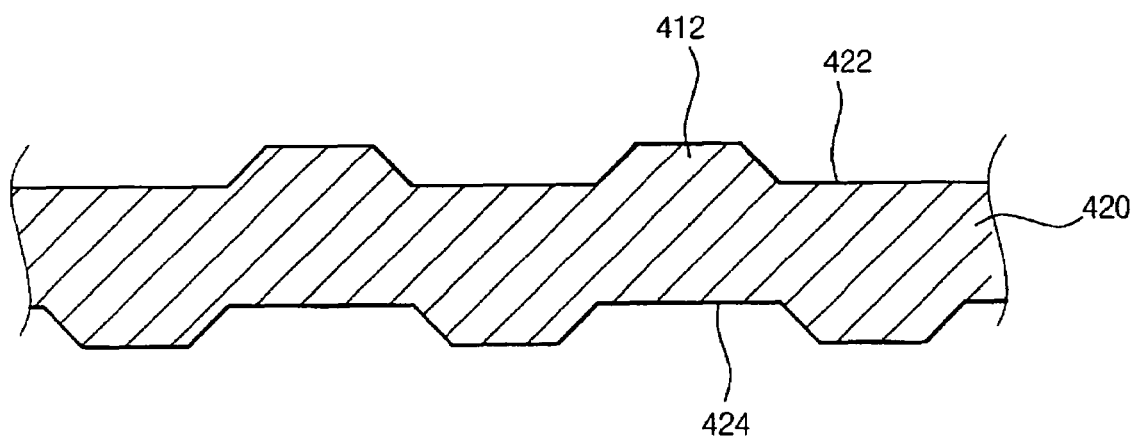
FIG. 7 is a cross-sectional view of another exemplary embodiment of the supporting member shown in FIG. 1.

FIG. 7 is a cross-sectional view of another exemplary embodiment of the supporting member 400 shown in FIG. 1. In FIG. 7, the same reference numerals denote the same elements in FIGS. 3 to 5, and thus any further descriptions of the same elements will be omitted.

Referring to FIG. 7, the protrusions 412 are formed on the first and second faces 422 and 424 of the first supporting portion 420, respectively. The first and second faces 422 and 424 face the flat-type fluorescent lamp 300 and the bottom 210 of the receiving container 200, respectively. In order to efficiently disperse the impact, the protrusions 412 formed on the second face 424 are not overlapped with the protrusions 412 formed on the first face 422, so that the first supporting member 420 may efficiently disperse the impact applied to the flat-type fluorescent lamp 300. In other words, if a protrusion 412 occupies a first location on the first face 422, then a line drawn perpendicularly through the first face 422 and the protrusion 412 in the first location passes through a second location on the second face 424. According to the illustrated embodiment of FIG. 7, a protrusion 412 would not be positioned within the second location on the second face 424. Likewise, if a protrusion 412 is provided within a third location on the second face 424, then a line drawn perpendicularly through the second face 424 and the protrusion 412 in the third location passes through a fourth location on the first face 422. According to the illustrated embodiment of FIG. 7, a protrusion 412 would not be positioned within the fourth location on the first face 422.

Figure 8:
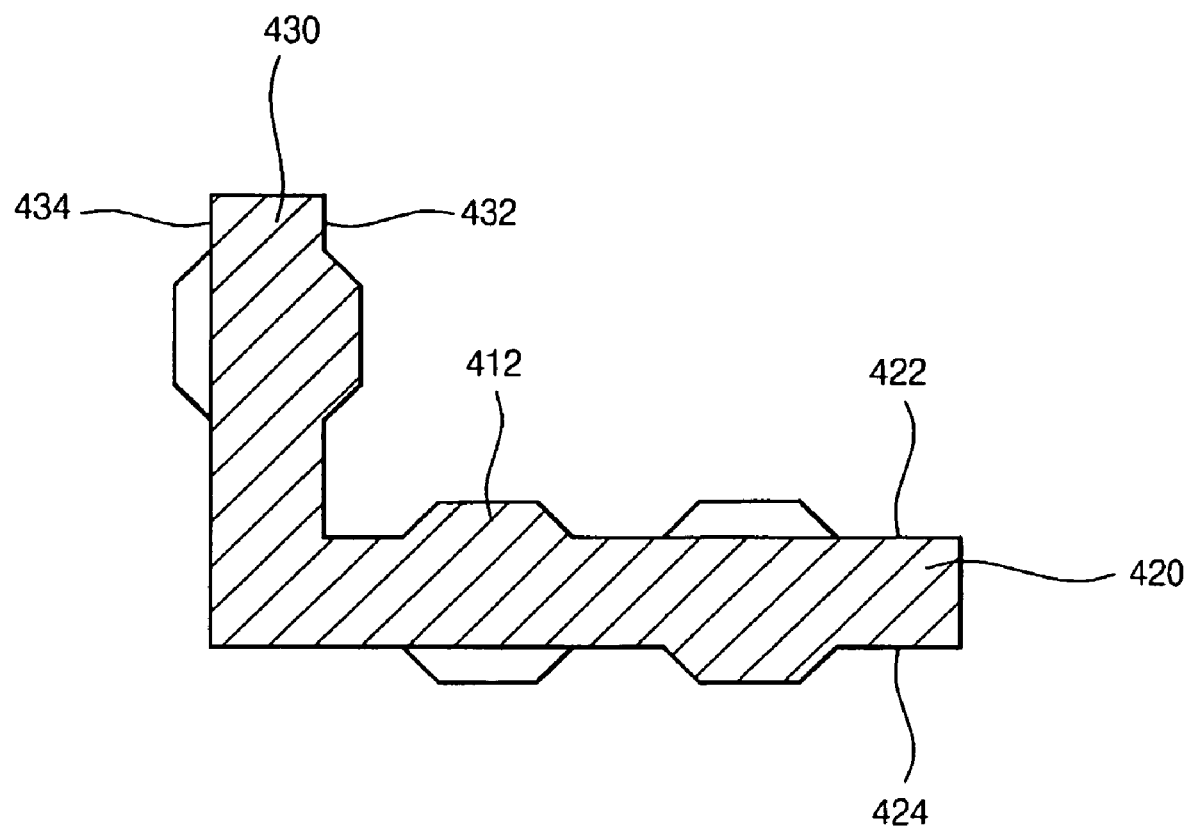
FIG. 8 is a cross-sectional view of another exemplary embodiment of the supporting member shown in FIG. 1.

FIG. 8 is a cross-sectional view of another exemplary embodiment of the supporting member 400 shown in FIG. 1. In FIG. 8, the same reference numerals denote the same elements in FIGS. 3 to 5 except positions of the protrusions, and thus any further descriptions of the same elements will be omitted.

Referring to FIG. 8, the protrusions 412 are formed at the first and second supporting portions 420 and 430. The protrusions 412 are formed on the first and second faces 422 and 424 of the first supporting portion 420, which are facing the lower face of the flat-type fluorescent lamp 300 and the bottom 210 of the receiving container 200, respectively. Also, the protrusions 412 are formed on a third face 432 and a fourth face 434 of the second supporting member 430. The third face 432 and the fourth face 434 of the second supporting member 430 face the side of the flat-type fluorescent lamp 300 and the side member 220 of the receiving container 200, respectively. In the embodiment shown, the supporting member 400 may buff the impact vertically and horizontally applied to the flat-type fluorescent lamp 300.

Alternatively, the protrusions 412 may be formed on only the first and third faces 422 and 432 or only the second and fourth faces 424 and 434.

Figure 9:
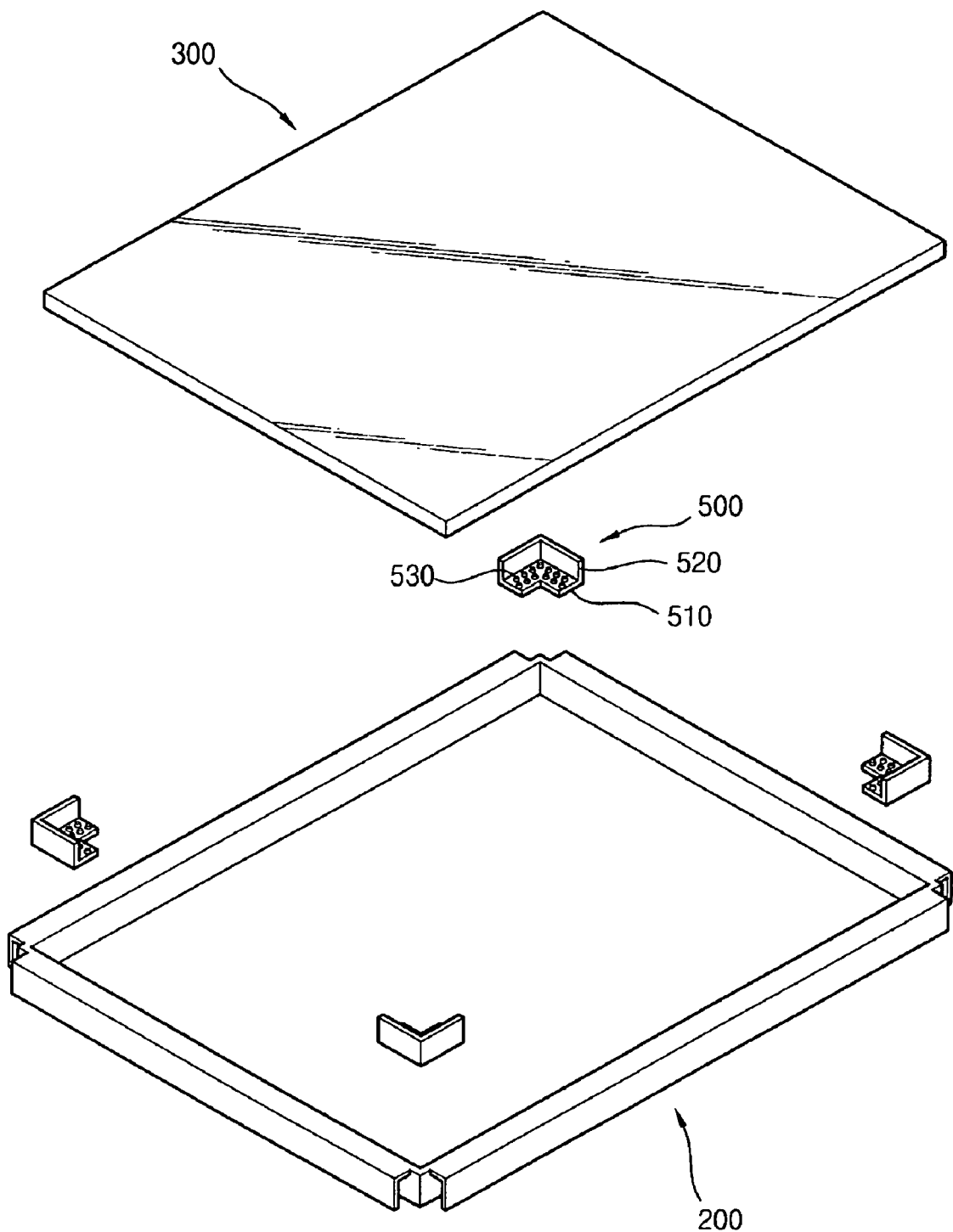
FIG. 9 is an exploded perspective view of another exemplary embodiment of the supporting member shown in FIG. 1.

FIG. 9 is a perspective view of another exemplary embodiment of the supporting member 400 shown in FIG. 1. In FIG. 9, the same reference numerals denote the same elements in FIG. 1 except for the supporting member 500 of FIG. 9, and thus any further descriptions of the same elements will be omitted.

Referring to FIG. 9, a supporting member 500 includes four pieces corresponding to four corners of the flat-type fluorescent lamp 300, respectively. Each of the pieces of the supporting member 500 has an L shape so as to support the corners in a stable condition. Each of the pieces of the supporting member 500 includes a first supporting portion 510 corresponding to a lower face of the flat-type fluorescent lamp 300. The first supporting portion 510 is generally flat. While the first supporting portion 510 is illustrated as having an L-shaped periphery, it should be understood that the first supporting portion 510 may instead have an alternatively shaped periphery, such as, but not limited to, a square or other rectangle. Each of the pieces of the supporting member 500 further includes a second supporting portion 520 corresponding to a side face, or two adjacent side faces, of the flat-type fluorescent lamp 300. As shown, the second supporting portion 510 includes a first side portion corresponding to a portion of a first side face of the flat-type fluorescent lamp 300, and a second side portion corresponding to a portion of a second side face of the flat-type fluorescent lamp 300, where the first side face and the second side face abut in a corner of the flat-type fluorescent lamp 300. Likewise, the first and second side portions of the second supporting portion 520 abut to form an angle corresponding to the corner of the flat-type fluorescent lamp 300. The second supporting portion 520 is extended from the first supporting portion 510 such as at a non-zero angle including, but not limited to, a 90 degree angle.

Each of the pieces of the supporting member 500 has protrusions 530 to buff the impact applied to the flat-type fluorescent lamp 300. The protrusions 530 may be formed either on the first supporting member 510 or on the first and second supporting portions 510 and 520. On the other hand, the protrusions 530 may be formed on only the face corresponding to the flat-type fluorescent lamp 300, the face corresponding to the receiving container 200 or the faces corresponding to the flat-type fluorescent lamp 300 and receiving container 200. In other words, any of the protrusion arrangements described with respect to the embodiments of FIGS. 1-8 may also be employed in the corner pieces of the embodiment illustrated in FIG. 9.

Figure 10:
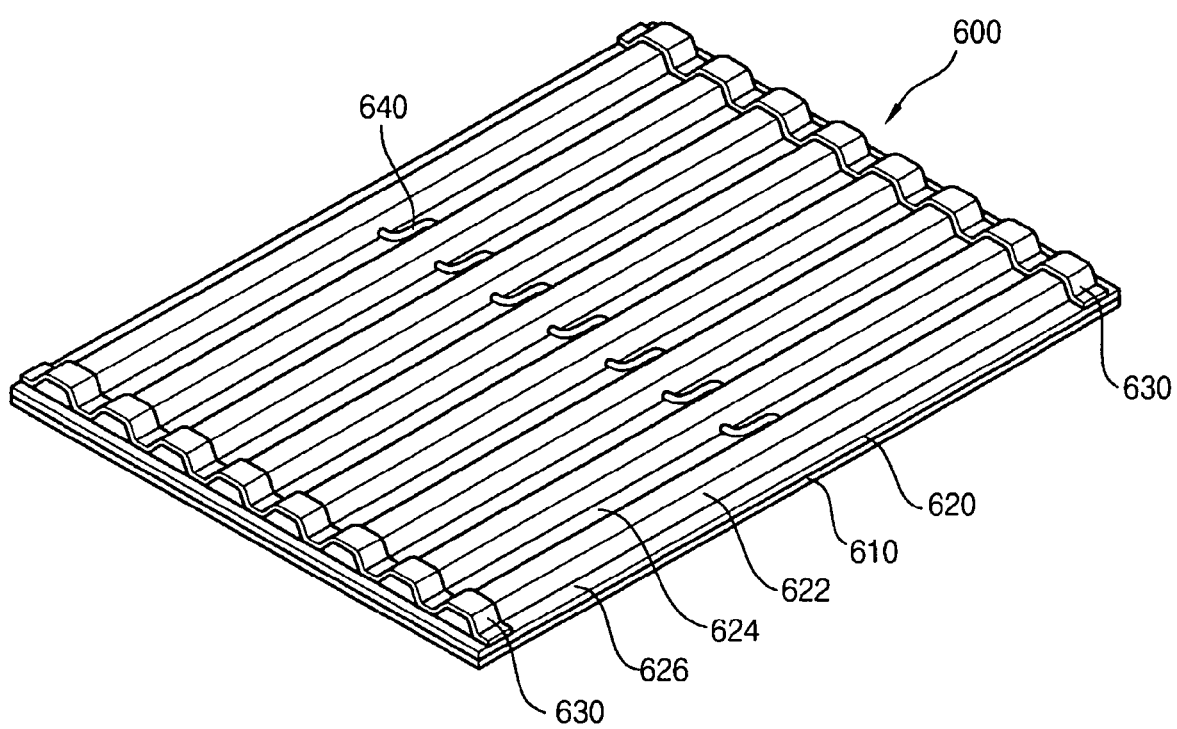
FIG. 10 is a perspective view of an exemplary embodiment of the flat-type fluorescent lamp shown in FIG. 1.
Figure 11:
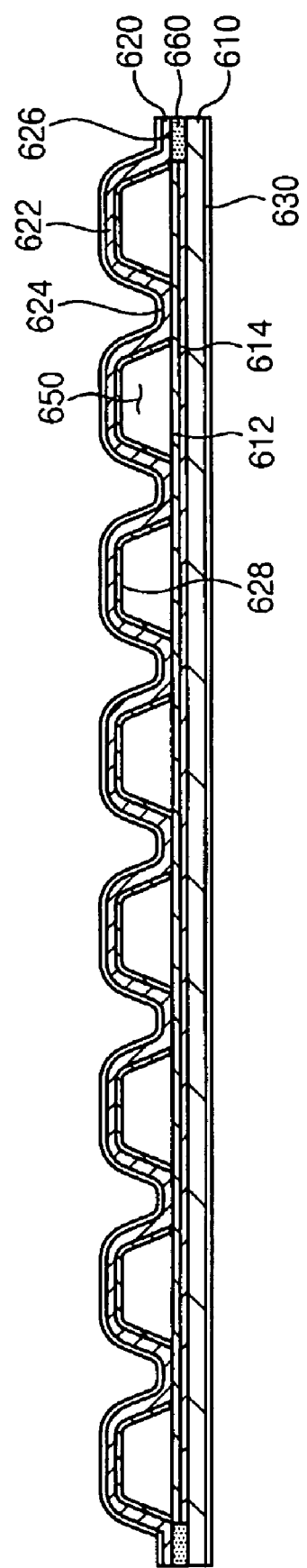
FIG. 11 is a cross-sectional view of the flat-type fluorescent lamp shown in FIG. 10.

FIG. 10 is a perspective view of an exemplary embodiment of the flat-type fluorescent lamp 300 shown in FIG. 1, which is demonstrated in FIG. 10 as flat-type florescent lamp 600. FIG. 11 is a cross-sectional view of the flat-type fluorescent lamp 600 shown in FIG. 10.

Referring to FIGS. 10 and 11, a flat-type fluorescent lamp 600 includes a first substrate 610 having a plate-like shape, a second substrate 620 combined with the first substrate 610 to form a plurality of discharge spaces 650 and at least one electrode 630 applying a discharge voltage to the discharge spaces 650.

The first substrate 610 has a substantially rectangular plate-like shape such as a transparent glass substrate that transmits visual light and blocks ultraviolet light.

The second substrate 620 is combined with the first substrate 610 to form the discharge spaces 650 and is formed of a transparent glass substrate. In order to form the discharge spaces 650, the second substrate 620 is not flat as is the first substrate 610. The second substrate 620 includes a plurality of discharge space portions 622, having a generally inverted U-shaped cross-sectional shape, spaced apart from the first substrate 610 to provide the discharge spaces 650, a plurality of space-dividing portions 624 disposed between the discharge space portions 622 and in contact with the first substrate 610, and a sealing portion 626 formed along ends of the second substrate 620, parallel to a longitudinal direction of the discharge spaces 650, and coupled to the first substrate 610.

In one method of manufacture, the second substrate 620 is formed through a molding process. That is, when a base substrate having a plate-like shape is heated at a predetermined temperature and molded through a mold, the second substrate 620 having the discharge space portions 622, the space-dividing portions 624 and the sealing portion 626 is formed. In an alternative method of manufacture, the second substrate 620 may be formed in such a manner that the base substrate is heated and air is injected into the heated base substrate to form the discharge space portions 622 and the space-dividing portions 624. Other methods of manufacturing the second substrate 620 are also within the scope of the flat-type fluorescent lamp 600.

The second substrate 620 has a cross-sectional profile of which a plurality of half-arches is arranged one after another as shown in FIG. 11 via the inverted U-shapes of the discharge space portions 622. However, the second substrate 620 may be allowed to have various cross-sectional profiles, for example, a semicircle, a square and so on.

The second substrate 620 is coupled to the first substrate 610 by means of an adhesive 660 such as a frit having a melting point lower than that of a glass. A frit is a powdered material prepared by fusing a physical mixture into a uniform melt, which is then quenched and milled into a fine homogeneous powder. The adhesive 660 is disposed between the first and second substrates 610 and 620 corresponding to a location of the sealing portion 626 of the second substrate 620, and then the adhesive 660 is fired, to thereby combine the first substrate 610 with the second substrate 620. In the exemplary embodiment, the adhesive 660 is formed only on the sealing portion 626 between the first and second substrates 610 and 620, and the adhesive 660 is not formed at an area where the space-dividing portions 624 are in contact with the first substrate 610. The space-dividing portions 624 are cohered to the first substrate 610 due to a pressure difference between an inner space and an outer space of the flat-type fluorescent lamp 600. An adhesive, such as adhesive 660, may further be used to seal the outer perimeter of the first and second substrates 610, 620 to each other on ends that correspond to the electrodes 630.

Particularly, when the first and second substrates 610 and 620 are coupled to each other and the air in the discharge spaces 650 is vented, the discharge spaces 650 maintain inner spaces thereof in a vacuum state. Various discharge gases are injected into the discharge spaces 650 for the plasma discharge. In exemplary embodiments, the discharge gas may have mercury (Hg), neon (Ne), argon (Ar), xenon (Xe), krypton (Kr) and so on. In one embodiment, a gas pressure of the discharge spaces 650 is maintained about 50 torr range lower than an atmospheric pressure of about 760 torr, where a torr is a unit of pressure equal to 1 mm Hg. Due to a pressure difference between the gas pressure of the discharge spaces 650 and the atmospheric pressure, force is applied to the flat-type fluorescent lamp 600 toward the discharge spaces 650, so that the space-dividing portions 624 are cohered to the first substrate 610.

The second substrate 620 has a connection path 640, or a plurality of connection paths 640, to connect adjacent discharge spaces 650 to each other. Each of the discharge spaces 650 is connected to adjacent discharge spaces 650 thereto by means of at least one connection path 640. Although only one connection path 640 is illustrated between each adjacent pair of discharge space portions 622, there may be multiple connection paths 640 between each adjacent pair of discharge space portions 622. The discharge gas injected into one of the discharge spaces 650 may flow to another of the discharge spaces 650 through the connection path 640 such that the discharge gas may uniformly spread into the discharge spaces 650 throughout.

The electrode 630 is formed at both ends of the flat-type fluorescent lamp 600 in a substantially perpendicular direction to a longitudinal direction of the discharge space portions 622, so that the electrode 630 is overlapped with all discharge spaces 650. That is, a discharge space portion 622 and discharge space 650 therein share a longitudinal axis, and other longitudinal axes of the other discharge space portions 622 and discharge spaces 650 are generally parallel therewith, and the electrode 630 is formed generally perpendicularly to the longitudinal axes. In an exemplary embodiment, the flat-type fluorescent lamp 600 includes first and second sides that include the sealing portions 626, and third and fourth sides that include the electrodes 630. The electrode 630 is formed on at least one outer face of the first substrate 610 and the second substrate 620. Alternatively, the electrode 630 may be formed at an inner face of the first substrate 610 and the second substrate 620.

In one exemplary embodiment of a method for forming the electrode 630, the electrode 630 is formed by spraying metal powder having at least one conductive material, such as, but not limited to, copper (Cu), nickel (Ni), silver (Ag), gold (Au), aluminum (Al), chrome (Cr), etc. In another exemplary embodiment of a method for forming the electrode 630, a conductive aluminum tape may be attached to the first substrate 610 or/and the second substrate 620. Also, the electrode 630 may be adhered to the first substrate 610 or/and the second substrate 620 by means of a conductive silver paste. The electrode 630 applies the discharge voltage to the flat-type fluorescent lamp 600, thereby generating the plasma in the discharge spaces 650.

The flat-type fluorescent lamp 600 further includes a first fluorescent layer 612 formed on an inner face of the first substrate 610 facing the second substrate 620, a reflecting layer 614, and a second fluorescent layer 628 formed on an inner face of the second substrate 620, facing the first substrate 610. The first and second fluorescent layers 612 and 628 are excited in response to ultraviolet light that is generated by the plasma discharge of the discharge spaces 650 to emit the visual light. The reflecting layer 614 is formed between the first substrate 610 and the first fluorescent layer 612. The reflecting layer 614 reflects the visual light emitted from the first and second fluorescent layers 612 and 628 toward the second substrate 620, thereby preventing the light from being leaked through the first substrate 610.

Figure 12:
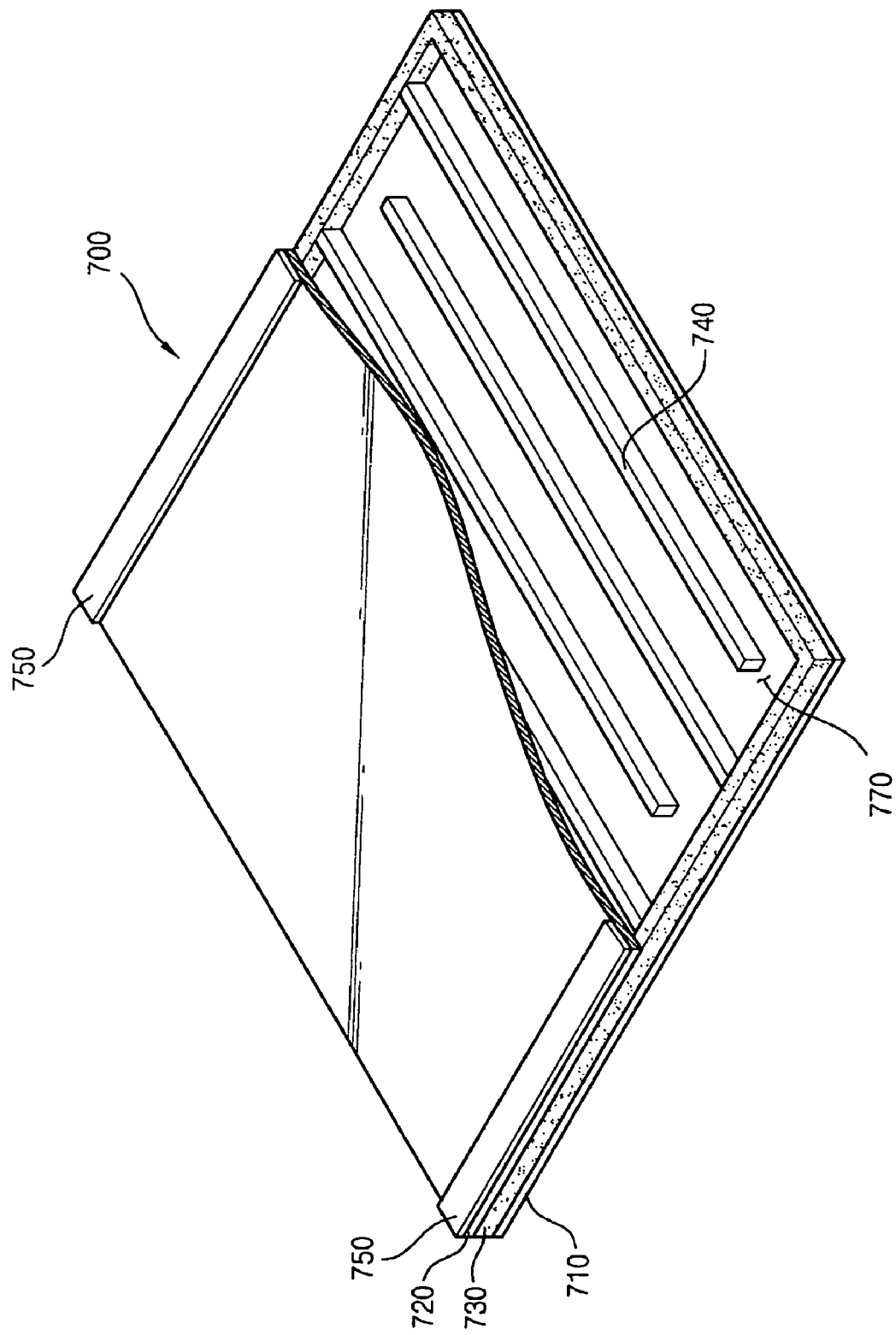
FIG. 12 is a perspective view of an exemplary embodiment of the flat-type fluorescent lamp shown in FIG. 1.
Figure 13:
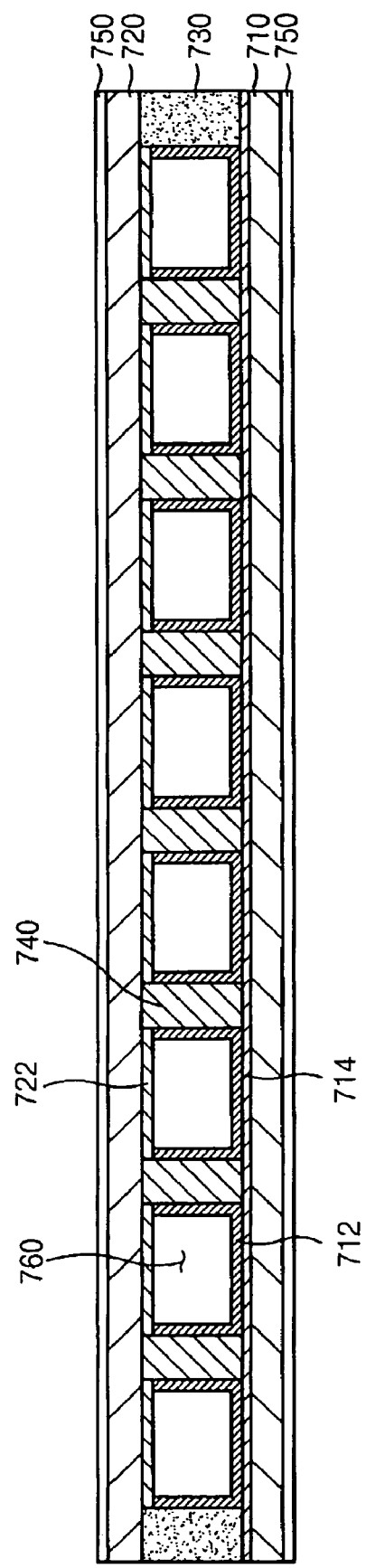
FIG. 13 is a cross-sectional view of the flat-type fluorescent lamp shown in FIG. 12.

FIG. 12 is a perspective view of an exemplary embodiment of the flat-type fluorescent lamp 300 shown in FIG. 1, shown as flat-type fluorescent lamp 700 in FIG. 12. FIG. 13 is a cross-sectional view of the flat-type fluorescent lamp shown in FIG. 12.

Referring to FIGS. 12 and 13, a flat-type fluorescent lamp 700 includes a first substrate 710, a second substrate 720, a sealing part 730, space-dividing walls 740 and one or more electrodes 750.

The first and second substrates 710 and 720 have a plate-like shape and include a transparent glass or similar substrate transmitting the visual light. The second substrate 720 is coupled to the first substrate 710 to form an inner space therebetween. The first and second substrates 710 and 720 may include a material blocking the ultraviolet light such that the ultraviolet light generated in the inner space is not leaked.

A sealing part 730 is disposed between the first and second substrates 710 and 720 and formed along an outer periphery of the first substrate 710 and the second substrate 720 so as to combine the first and second substrates 710 and 720. In one exemplary embodiment, the sealing part 730 includes the same glass material as used for the first and second substrates 710 and 720. The sealing part 730 is coupled to the first and second substrates 710 and 720 by means of an adhesive such as a frit having a melting point lower than that of a glass.

The space-dividing walls 740 are disposed between the first and second substrates 710 and 720 and divide the inner space between the first and second substrates 710 and 720 into a plurality of longitudinally arranged discharge spaces 760. The space-dividing walls 740 have a bar-like shape. The space-dividing walls 740 are extended in a first direction from the first substrate 710 to the second substrate 720 and arranged in a second direction substantially perpendicular to the first direction, alternatingly from a first end of the lamp 700 towards a second end of the lamp 700 and from the second end of the lamp 700 towards the first end of the lamp 700. The space-dividing walls 740 are spaced apart from each other by a predetermined distance, where the distance may be constant for forming equally sized discharge spaces 760. The space-dividing walls 740, having the same glass material as used for the first and second substrates 710 and 720 are adhered to the first and second substrates 710 and 720 by means of the adhesive such as the frit. Alternatively, the space-dividing walls 740 may be formed in such a manner where a melted raw material of the space-dividing walls 740 is sprayed using a dispenser. Other method of forming the space-dividing walls 740 are also within the scope of the flat-type fluorescent lamp 700.

The flat-type fluorescent lamp 700 has a connection path 770 to connect adjacent discharge spaces 760 to each other. To provide the connection path 770, at least one longitudinal end or both ends of each of the space-dividing walls 740 is spaced apart from the sealing part 730. In the present embodiment, the space-dividing walls 740 are arranged in a serpentine shape for the connection path 770. That is, when a first end of a first space-dividing wall among the space-dividing walls 740 is spaced apart from the sealing part 730, a second end opposite to the first end of an adjacent space-dividing wall to the first space-dividing wall is spaced apart from the sealing part 730. Alternatively, the connection path 770 may be formed in such a manner where a portion between ends of each of the space-dividing walls 740 is partially removed while both ends of each of the space-dividing walls 740 are attached to the sealing part 730. The discharge gas injected into at least one discharge space 760 is applied to an adjacent discharge space 760 through the connection path 770, thereby uniformly applying the discharge gas to all discharge spaces 760.

The electrode 750 is formed at both longitudinal ends of the space-dividing walls 740, and extended in a direction substantially perpendicular to a longitudinal axis of the space-dividing walls 740, so that the electrode 750 is intersected with the discharge spaces 760. The electrode 750 is formed on at least one outer face of an outer face of the first substrate 710 and an outer face of the second substrate 720. Alternatively, the electrode 750 may be formed at an inner face of the first substrate 710 or an inner face of the second substrate 720.

The flat-type fluorescent lamp 700 further includes a first fluorescent layer 712, a second fluorescent layer 722, and a reflecting layer 714.

The first fluorescent layer 712, having a U-shaped or channel-shaped cross-sectional shape, is formed on the inner face of the first substrate 710 facing the second substrate 720 and side faces of the space-dividing walls 714 in a thin film form, and the second fluorescent layer 722 is formed on the inner face of the second substrate 720 facing the first substrate 710. That is, each of the discharge spaces 760 is enveloped by the first and second fluorescent layers 712 and 722. The first and second fluorescent layers 712 and 722 are excited by the ultraviolet light generated through the plasma discharge to emit the visual light.

The reflecting layer 714 is formed between the first substrate 710 and the first fluorescent layer 712, and may further extend between space-dividing walls 740 and first substrate 710. The reflecting layer 714 reflects the visual light emitted from the first and second fluorescent layers 712 and 722 toward the second substrate 720, thereby preventing the light from being leaked through the first substrate 710. In order to enhance reflectance and reduce variation of color coordinates, the reflecting layer 714 includes a metal oxide material such as, but not limited to, aluminum oxide ($Al_2O_3$), barium sulfate ($BaSO_4$), etc. The reflecting layer 714 is formed by a coating process, or other suitable process.

Figure 14:
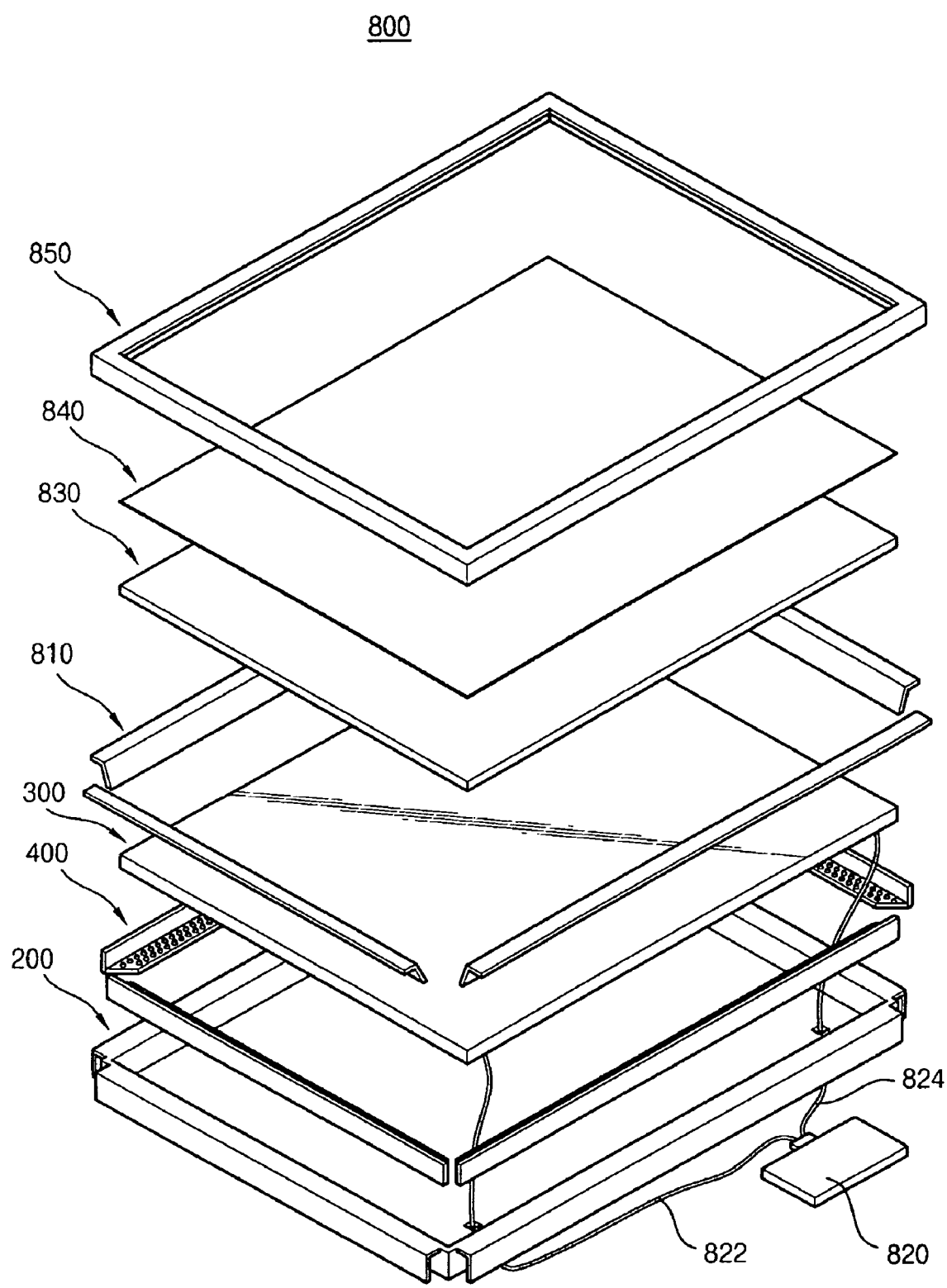
FIG. 14 is an exploded perspective view of another exemplary embodiment of a backlight assembly.
Figure 15:
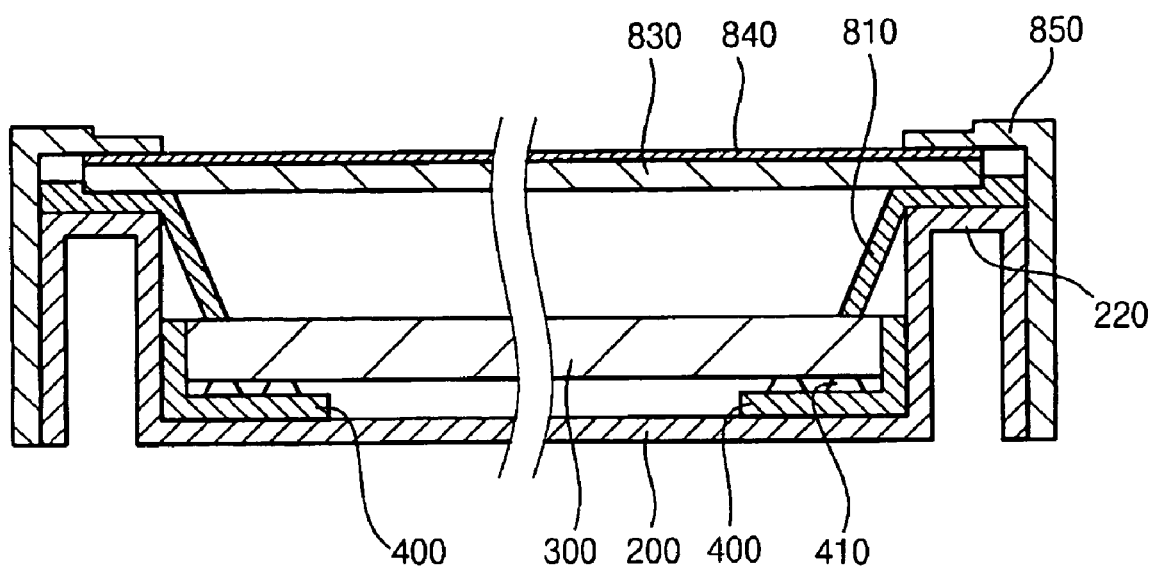
FIG. 15 is a cross-sectional view of the backlight assembly shown in FIG. 14.

FIG. 14 is an exploded perspective view of another exemplary embodiment of a backlight assembly. FIG. 15 is a cross-sectional view of the backlight assembly shown in FIG. 14. In the present embodiment, the same reference numerals denote the same elements in FIG. 1, and thus any further descriptions of the same elements will be omitted.

Referring to FIGS. 14 and 15, a backlight assembly 800 includes a receiving container 200, a flat-type fluorescent lamp 300 and a supporting member 400. While one exemplary embodiment of the supporting member 400 is shown for use in the backlight assembly 800, it should be understood that any supporting member including, but not limited to, the above-described supporting members as illustrated in FIGS. 1-9, may be utilized within the backlight assembly 800. The backlight assembly 800 may further include a first frame 810 disposed on the flat-type fluorescent lamp 300 and an inverter 820 disposed on a rear face of the receiving container 200.

The first frame 810 is coupled to a side member 220 of the receiving container 200 so as to fix an end of the flat-type fluorescent lamp 300 to the supporting member 400. As shown in FIG. 14, the first frame 810 may include four pieces corresponding to sides of the flat-type fluorescent lamp 300, respectively. Alternatively, the four pieces of the first frame 810 may be integrally formed into one piece such as a rectangular frame shape or two pieces such as a laid-U shape and an L shape. While one embodiment of a flat-type fluorescent lamp 300 is shown for use in the backlight assembly 800, it should be understood that any flat-type fluorescent lamp may be employed in the backlight assembly 800 including, but not limited to, the fluorescent lamps illustrated in FIGS. 10-13.

The inverter 820 generates a discharge voltage to drive the flat-type fluorescent lamp 300. The inverter 820 boosts an alternating current voltage to be emitted as the discharge voltage. The discharge voltage from the inverter 820 is applied to the flat-type fluorescent lamp 300 via the first and second power lines 822 and 824. The channel of the channel-shaped side member 220 may be utilized for guiding the first power line 822 as shown, and may further guide the second power line 824 within certain configurations.

The backlight assembly 800 may further include a diffusion plate 830, an optical sheet 840 sequentially disposed on the first frame 810, and a second frame 850 that fixes the diffusion plate 830 and the optical sheet 840 to the first frame 810. The diffusion plate 830 diffuses the light emitted from the flat-type fluorescent lamp 300 to improve brightness uniformity. The diffusion plate 830 has a plate-like shape, and is supported by the first frame 810 such that the diffusion plate 830 is spaced apart from the flat-type fluorescent lamp 300 by a predetermined distance, as exemplararily illustrated in FIG. 15. The optical sheet 840 includes a prism sheet and/or a diffusion sheet. The prism sheet condenses the diffused light by the diffusion plate 830 so as to enhance brightness at a front view of a display, and the diffusion sheet diffuses again the diffused light by the diffusion plate 830. Further, the backlight assembly 800 may add a separate optical sheet thereto or remove the optical sheet 840 therefrom in accordance with required brightness characteristics. The second frame 850 is disposed above the optical sheet 840 at a periphery thereof and coupled to the receiving container 200, thereby fixing the diffusion plate 830 and the optical sheet 840 to the first frame 810.

Figure 16:
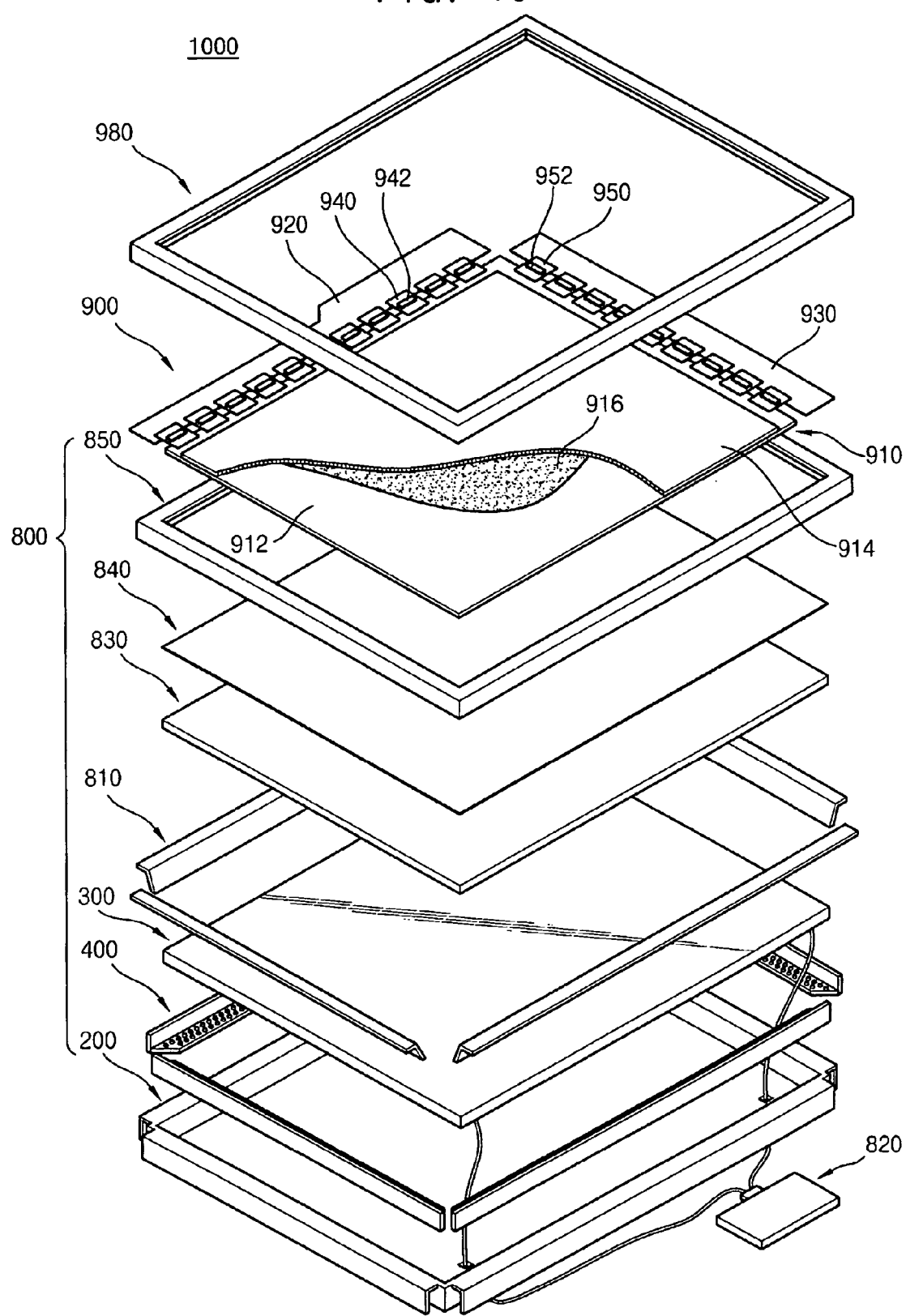
FIG. 16 is an exploded perspective view of an exemplary embodiment of a liquid crystal display apparatus.

FIG. 16 is an exploded perspective view of an exemplary embodiment of a liquid crystal display apparatus. In FIG. 16, the same reference numerals denote the same elements in FIGS. 14 and 15, and thus any further descriptions of the same elements will be omitted.

Referring to FIG. 16, a liquid crystal display apparatus 1000 includes a backlight assembly 800 generating a light, a display unit 900 displaying an image and a top chassis 980 fixing the display unit 900 to the backlight assembly 800.

The display unit 900 has a liquid crystal display panel 910 displaying an image, and data and gate printed circuit boards 920 and 930 applying driving signals for the liquid crystal display panel 910. The driving signals from the data and gate printed circuit boards 920 and 930 are applied to the liquid crystal display panel 910 through data and gate flexible printed circuit films 940 and 950, respectively. Each of the data flexible printed circuit film 940 and the gate flexible printed circuit film 950 has a tape carrier package or a chip-on-film. The data and gate flexible printed circuit films 940 and 950 have a data driving chip 942 and a gate driving chip 952, respectively, so as to timely apply the driving signals from the data and gate printed circuit boards 920 and 930 to the liquid crystal display panel 910.

The liquid crystal display panel 910 has a thin film transistor ("TFT") substrate 912, a color filter substrate 914 coupled to the TFT substrate 912 and a liquid crystal containing liquid crystal layer 916 interposed between the TFT substrate 912 and the color filter substrate 914.

The TFT substrate 912 is a transparent glass substrate on which TFTs are formed in a matrix configuration. Each of the TFTs has a source connected to a data line, a gate connected to a gate line and a drain connected to a pixel electrode (not shown) that is a transparent and conductive material.

RGB pixels (not shown), which are color pixels for emitting predetermined colors when the light passes therethrough, are formed on the color filter substrate 914 by a thin film process. The color filter substrate 914 further has a common electrode (not shown) formed thereon. The common electrode is formed of a transparent conductive material.

When a power is applied to the gate of the TFT and the TFT is turned on, an electric field is generated between the pixel electrode and the common electrode of the color filter substrate 914. The electric field varies an aligning angle of the liquid crystal layer 916 interposed between the TFT substrate 912 and the color filter substrate 914. Thus, a light transmittance of the liquid crystal layer 916 is varied in accordance with the variation of the aligning angle of the liquid crystal, so a desired image may be obtained.

The top chassis 980 is coupled to the receiving container 200 while wrapping an edge of the liquid crystal display panel 910 so as to fix the liquid crystal display panel 910 to the backlight assembly 800. The top chassis 980 prevents damage of the liquid crystal display panel 910 and separation of the liquid crystal display panel 910 from the backlight assembly 800.

According to the backlight assembly and the liquid crystal display apparatus, the supporting member supporting the flat-type fluorescent lamp has a buffer to buff external impact applied to the flat-type fluorescent lamp, thereby enhancing impact resistance of the backlight assembly and preventing damage of the flat-type fluorescent lamp.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A backlight assembly comprising:
   a receiving container having a bottom and a side member to provide a receiving space;
   a flat-type fluorescent lamp received within the receiving container, the flat-type fluorescent lamp emitting a light; and
   a supporting member having a buffer disposed between the receiving container and the flat-type fluorescent lamp to buff an impact applied to the flat-type fluorescent lamp, the supporting member including a material having elasticity;
   wherein the buffer comprises protrusions protruding from a face of the supporting member.

2. The backlight assembly of claim 1, wherein the protrusions are formed on a first face of the supporting member, wherein the first face of the supporting member faces the flat-type fluorescent lamp.

3. The backlight assembly of claim 1, wherein the protrusions are formed on a face of the supporting member, wherein the face of the supporting member faces the receiving container.

4. The backlight assembly of claim 1, wherein the protrusions are formed on a first face of the supporting member, the first face facing the flat-type fluorescent lamp, and further wherein the protrusions are formed on a second face of the supporting member, the second face facing the bottom of the receiving container.

5. The backlight assembly of claim 4, wherein the protrusions on the first face are not aligned with the protrusions on the second face.

6. The backlight assembly of claim 1, wherein at least one of the protrusions comprises a trapezoidal cross-sectional profile when the protrusions are cut in a direction substantially perpendicular to the face of the supporting member.

7. The backlight assembly of claim 1, wherein at least one of the protrusions comprises a circular cross-sectional profile when the protrusions are cut in a direction substantially parallel to the face of the supporting member.

8. The backlight assembly of claim 1, wherein the supporting member is disposed at a position corresponding to an end portion of the flat-type fluorescent lamp.

9. The backlight assembly of claim 1, wherein the supporting member is disposed at positions corresponding to at least one corner of the flat-type fluorescent lamp.

10. The backlight assembly of claim 1, wherein the supporting member comprises:
    a first supporting portion corresponding to a face of the flat-type fluorescent lamp facing the bottom of the receiving container; and
    a second supporting portion corresponding to a side face of the flat-type fluorescent lamp, the second supporting portion extending from the first supporting portion and interposed between the side face of the flat-type fluorescent lamp and the side member of the receiving container.

11. The backlight assembly of claim 10, wherein the buffer is formed on the first supporting portion.

12. The backlight assembly of claim 10, wherein the buffer is formed on the first and second supporting portions.

13. The backlight assembly of claim 1, wherein the supporting member comprises an electrically insulating material.

14. The backlight assembly of claim 1, wherein the flat-type fluorescent lamp comprises:
    a first substrate having a flat plate-like shape;
    a second substrate coupled to the first substrate to provide a plurality of discharge spaces; and
    an electrode applying a discharge voltage to the discharge spaces.

15. The backlight assembly of claim 14, wherein the second substrate comprises:
- a plurality of discharge-space dividing parts engaged with the first substrate, wherein discharge spaces formed between the discharge-space dividing parts are spaced apart from each other; and
- a sealing member formed on an end portion of the second substrate to couple the second substrate to the first substrate.

16. The backlight assembly of claim 1, wherein the flat-type fluorescent lamp comprises:
- a first substrate having a flat plate-like shape;
- a second substrate having a flat plate-like shape and coupled to the first substrate to form an inner space between the first and second substrates;
- a sealing member disposed between the first and second substrates to couple the second substrate to the first substrate, the sealing member disposed between the first and second substrates;
- a space-dividing wall disposed between the first and second substrates to divide the inner space into a plurality of discharge spaces; and
- an electrode applying a discharge voltage to the discharge spaces.

17. The backlight assembly of claim 1, further comprising:
- a first frame fixing an end portion of an upper face of the flat-type fluorescent lamp to the receiving container, the upper face opposite a lower face of the flat-type fluorescent lamp, wherein the lower face faces the bottom of the receiving container; and
- an inverter generating a discharge voltage for the flat-type fluorescent lamp, the inverter disposed on a rear face of the receiving container.

18. The backlight assembly of claim 17, further comprising:
- a diffusion plate disposed on the first frame to diffuse the light from the flat-type fluorescent lamp;
- an optical sheet disposed on the diffusion plate; and
- a second frame coupled to the receiving container to fix the diffusion plate and the optical sheet relative to the receiving container.

19. The backlight assembly of claim 1, wherein the supporting member comprises silicone.

20. A liquid crystal display apparatus comprising:
a backlight assembly comprising:
- a receiving container having a bottom and a side member to provide a receiving space;
- a flat-type fluorescent lamp received within the receiving container, the flat-type fluorescent lamp emitting a light; and
- a supporting member having a buffer disposed between the receiving container and the flat-type fluorescent lamp to buff an impact applied to the flat-type fluorescent lamp, the supporting member including a material having elasticity;
- a liquid crystal display panel disposed on the backlight assembly to display an image using the light from the backlight assembly; and
- a top chassis fixing the liquid crystal display panel to the backlight assembly wherein the buffer comprises protrusions protruding from a face of the supporting member.

21. The liquid crystal display apparatus of claim 20, wherein the protrusions are formed on at least one face of first and second faces of the supporting member, wherein the first face faces the flat-type fluorescent lamp and the second face faces the bottom of the receiving container.

22. The liquid crystal display apparatus of claim 20, wherein the supporting member is disposed at a position corresponding to an end portion of the flat-type fluorescent lamp.

23. The liquid crystal display apparatus of claim 20, wherein the supporting member comprises:
- a first supporting portion corresponding to a lower face of the flat-type fluorescent lamp, the lower face facing the bottom of the receiving container; and
- a second supporting portion corresponding to a side face of the flat-type fluorescent lamp, the side face of the flat-type fluorescent lamp facing the side member of the receiving container, the second supporting portion extending from the first supporting portion.

24. The liquid crystal display apparatus of claim 23, wherein the buffer is formed on at least one of the first and second supporting portions.

25. The liquid crystal display apparatus of claim 20, wherein the flat-type fluorescent lamp comprises:
- a first substrate having a flat plate-like shape;
- a second substrate including:
- a plurality of discharge-space dividing parts engaged with the first substrate, wherein discharge spaces formed between the discharge-space dividing parts are spaced apart from each other; and
- a sealing member formed on an end portion of the second substrate to couple the second substrate to the first substrate; and
- an electrode applying a discharge voltage to the discharge spaces.

26. The liquid crystal display apparatus of claim 20, wherein the flat-type fluorescent lamp comprises:
- a first substrate having a flat plate-like shape;
- a second substrate having a flat plate-like shape and coupled to the first substrate to form an inner space between the first and second substrate;
- a sealing member disposed between the first and second substrates to couple the second substrate to the first substrate, the sealing member disposed between the first and second substrates;
- a space-dividing wall disposed between the first and second substrates to divide the inner space into a plurality of discharge spaces; and
- an electrode applying a discharge voltage to the discharge spaces.

27. The liquid crystal display apparatus of claim 20, wherein the backlight assembly further comprises:
- a first frame fixing an end portion of an upper face of the flat-type fluorescent lamp to the receiving container;
- a diffusion plate disposed on the first frame to diffuse the light from the flat-type fluorescent lamp;
- a second frame coupled to the receiving container to fix the diffusion plate relative to the receiving container; and
- an inverter disposed on a rear face of the receiving container to generate a discharge voltage for the flat-type fluorescent lamp.

28. The liquid crystal display apparatus of claim 20, wherein the supporting member comprises silicone.

29. A supporting member for buffing an impact applied to a flat-type fluorescent lamp, the supporting member comprising:
- a plurality of supporting devices, each of the supporting devices including:
- a first supporting portion;
- a second supporting portion extending from the first supporting portion at a non-zero angle; and a plurality of protrusions protruding from at least one of the first supporting portion and the second supporting portion, wherein the plurality of supporting devices are evenly distributable about a flat-type fluorescent lamp and the supporting member comprises a material having elasticity.

30. The supporting member of claim 29, comprising four supporting devices.

31. The supporting member of claim 30, wherein the first supporting portion and the second supporting portion of each supporting device are perpendicularly arranged for protecting an edge of a flat-type fluorescent lamp.

32. The supporting member of claim 30, wherein the second supporting portion of each supporting device includes a pair of substantially perpendicular faces arranged for protecting a corner of a flat-type fluorescent lamp.

33. The supporting member of claim 29, wherein the supporting member comprises silicone.

34. A method of protecting a flat-type fluorescent lamp within a backlight assembly from damage resulting from external impacts, the backlight assembly including a receiving container having a bottom and a side member for providing a receiving space for receiving the flat-type fluorescent lamp, the method comprising:

providing a supporting member with a plurality of protrusions protruding from a face of the supporting member, the supporting member including a material having elasticity; and inserting the supporting member between the receiving container and the flat-type fluorescent lamp.

35. The method of claim 34, wherein inserting the supporting member between the receiving container and the flat-type fluorescent lamp comprises inserting a first supporting portion between the flat-type fluorescent lamp and the bottom portion of the receiving container, and inserting a second supporting portion between the flat-type fluorescent lamp and the side member of the receiving container, wherein the second supporting portion extends angularly from the first supporting portion.

36. The method of claim 34, wherein the supporting member comprises silicone.

* * * * *